United States Patent
Sumida

(10) Patent No.: US 11,940,090 B1
(45) Date of Patent: Mar. 26, 2024

(54) MAGNETIC RING STAND AND BOTTLE OPENER FOR SMARTPHONE

(71) Applicant: E-filliate, Inc., Rancho Cordova, CA (US)

(72) Inventor: Wesley K. Sumida, Fair Oaks, CA (US)

(73) Assignee: E-filliate, Inc., Rancho Cordova, CA (US)

( * ) Notice: Subject to any disclaimer, the term of this patent is extended or adjusted under 35 U.S.C. 154(b) by 0 days.

(21) Appl. No.: 17/903,520

(22) Filed: Sep. 6, 2022

Related U.S. Application Data

(60) Provisional application No. 63/240,505, filed on Sep. 3, 2021.

(51) Int. Cl.
*F16M 13/02* (2006.01)
*B67B 7/16* (2006.01)
*F16B 1/00* (2006.01)
*F16M 13/00* (2006.01)
*F16M 13/06* (2006.01)

(52) U.S. Cl.
CPC ............... *F16M 13/02* (2013.01); *B67B 7/16* (2013.01); *F16B 1/00* (2013.01); *F16M 13/005* (2013.01); *F16M 13/06* (2013.01); *F16B 2200/83* (2023.08)

(58) Field of Classification Search
CPC ...... F16M 13/06; F16M 13/005; F16M 13/02; F16B 1/00; F16B 2001/0035; F16B 2200/83; B67B 7/16
See application file for complete search history.

(56) References Cited

U.S. PATENT DOCUMENTS

| | | | | |
|---|---|---|---|---|
| 7,494,239 | B2 * | 2/2009 | Riccardi | H04M 1/04 7/151 |
| D666,070 | S * | 8/2012 | Shaashua | H04B 1/3888 D8/40 |
| 8,483,786 | B2 * | 7/2013 | Ramies | B67B 7/16 455/575.8 |
| 8,579,172 | B2 * | 11/2013 | Monaco | H04M 1/15 224/191 |
| 8,971,975 | B2 * | 3/2015 | Ramies | H04B 1/3888 455/575.8 |
| 9,004,333 | B2 * | 4/2015 | Monaco | H04R 1/1033 206/320 |
| D740,269 | S * | 10/2015 | Monaco | H04M 1/04 D14/250 |
| 9,379,759 | B2 * | 6/2016 | Platt | H04B 1/3888 |
| D769,855 | S * | 10/2016 | Deng | B25J 1/04 D14/250 |

(Continued)

*Primary Examiner* — Eret C McNichols
(74) *Attorney, Agent, or Firm* — Heisler & Associates

(57) ABSTRACT

An outer base of annular form surrounds an open space. The base includes a magnet for attachment of the outer base to a rear of a smartphone. A center ring surrounds the open space. This ring has a bearing on an outside edge which rotates relative to a race on an inner edge of the base, allowing the center ring to rotate relative to the base. A pair of ears extend radially inwardly into this open space, with the ears attached either to the ring or base. The ears are sized and spaced apart an appropriate distance to allow one ear to lift a crimped edge of a bottle cap while the other ear rests upon a top of the bottle cap. A loop is pivotably attached to the center ring and provides a stand or a finger loop or allows a smartphone to be suspended from a hook.

15 Claims, 3 Drawing Sheets

(56) References Cited

U.S. PATENT DOCUMENTS

| | | | | |
|---|---|---|---|---|
| 9,538,669 B2* | 1/2017 | Fife | ............ | H05K 5/0086 |
| 9,894,192 B2* | 2/2018 | Cox, III | ............ | G06F 1/1656 |
| 10,899,285 B2* | 1/2021 | Aloe | ............ | F16M 11/041 |
| 11,173,591 B2* | 11/2021 | Gause | ............ | B25F 1/006 |
| 11,266,192 B2* | 3/2022 | Pagano | ............ | A44B 11/263 |
| 11,552,667 B2* | 1/2023 | Balderston | ............ | H04B 1/3877 |
| 2006/0146483 A1* | 7/2006 | Patino | ............ | H05K 5/0086 |
| | | | | 361/600 |
| 2008/0232089 A1* | 9/2008 | Riccardi | ............ | H04M 1/04 |
| | | | | 362/109 |
| 2010/0033069 A1* | 2/2010 | Chang | ............ | B67B 7/16 |
| | | | | 312/333 |
| 2011/0253569 A1* | 10/2011 | Lord | ............ | H04M 1/21 |
| | | | | 206/320 |
| 2018/0063306 A1* | 3/2018 | Scannell, Jr. | ............ | A45F 5/021 |
| 2019/0357649 A1* | 11/2019 | Becnel | ............ | B67B 7/16 |
| 2021/0112935 A1* | 4/2021 | Tran | ............ | B67B 7/44 |
| 2021/0394355 A1* | 12/2021 | Bares | ............ | B25J 1/04 |
| 2022/0151354 A1* | 5/2022 | Soderstrom | ............ | A45C 13/02 |

\* cited by examiner

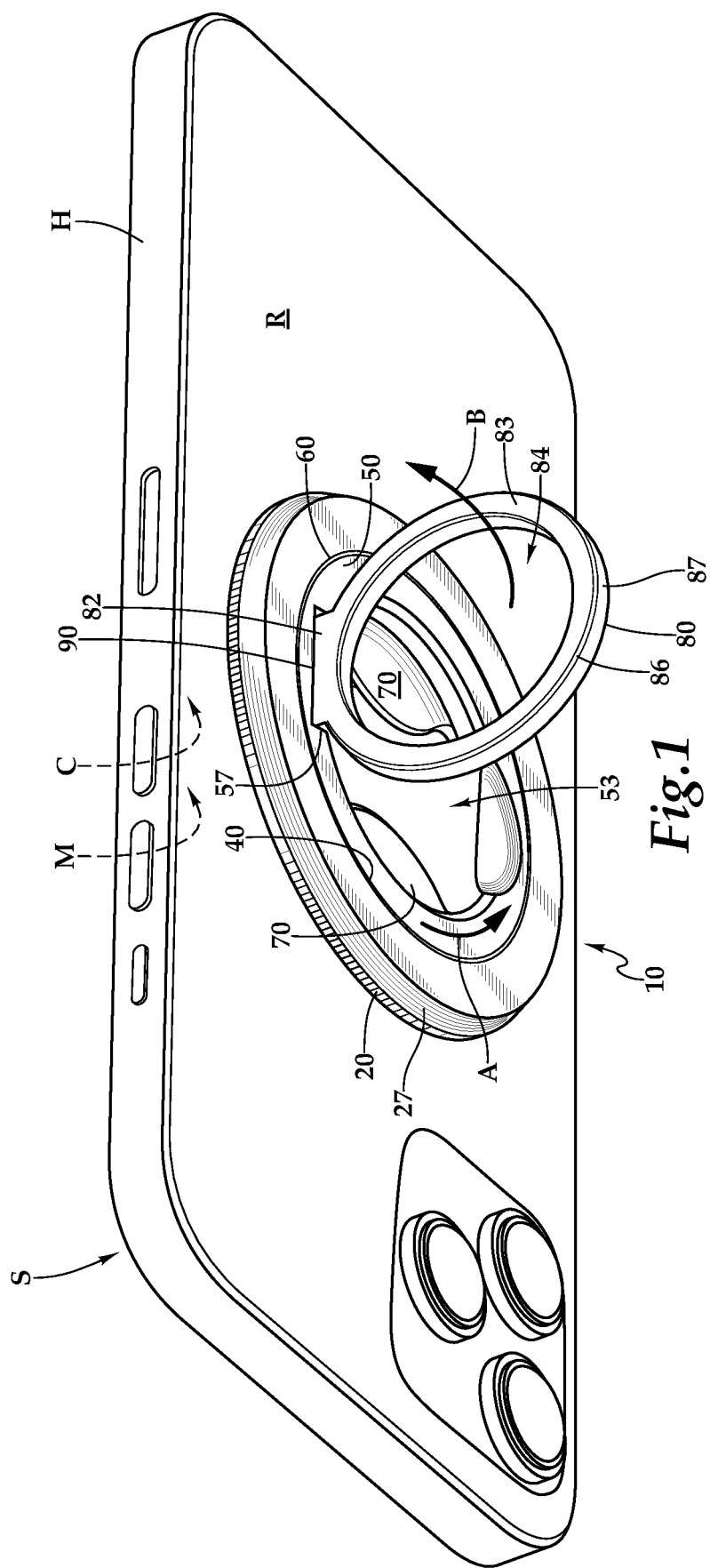

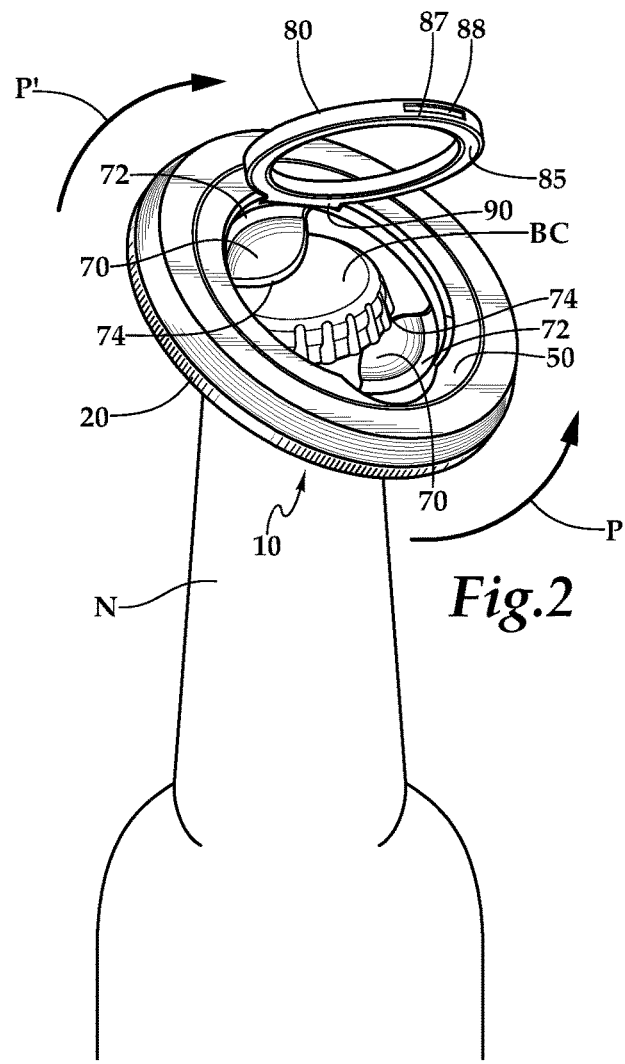
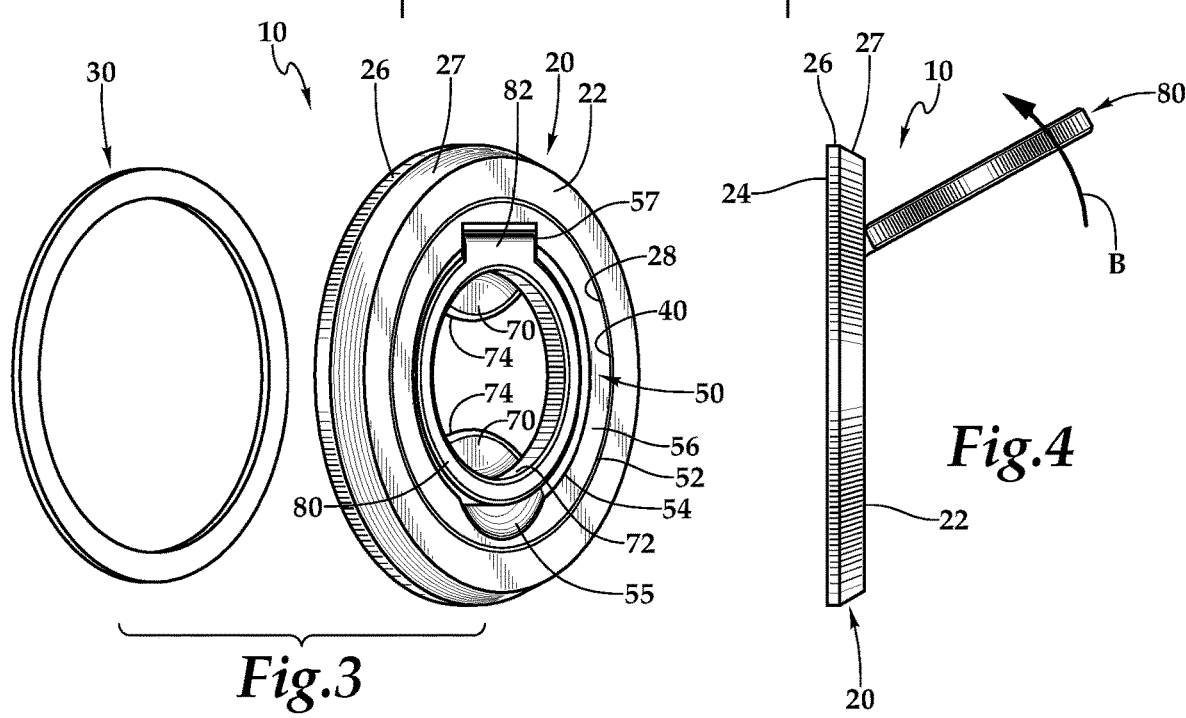

MAGNETIC RING STAND AND BOTTLE OPENER FOR SMARTPHONE

CROSS-REFERENCE TO RELATED APPLICATIONS

This application claims benefit under Title 35, United States Code § 119(e) of U.S. Provisional Application No. 63/240,505 filed on Sep. 3, 2021.

FIELD OF THE INVENTION

The following invention relates to stands and holding devices which are attachable to a smartphone to assist in holding the smartphone in a hand or on a surface or other support. More particularly, this invention relates to stands and holding devices which are attachable magnetically to a rear of a smartphone and which rotate into different positions and which include a bottle opener for opening a beverage container.

BACKGROUND OF THE INVENTION

Smartphones have become a valuable tool, providing their users with not only two-way communication by voice and text and video, but also to supply the user with a myriad of useful functions through software "apps" running on the smartphone. To enhance the usability of the smartphone and to protect it from damage, various physical accessories are provided which are attached to an exterior of the smartphone. Such accessories include smartphone cases, holders and stands.

While smartphones include an outer housing to provide some degree of protection, cases are often provided to protect the outer housing of the smartphone and to better distribute shock loads which the smartphone may encounter, such as when dropped. The cases include openings and/or windows to allow for camera lenses to be unobstructed and to allow for access to buttons on the main screen of the smartphone. Such cases are also configured so that they do not interfere with the telecommunications antenna associated with the smartphone. Many smartphones are now equipped with wireless charging equipment, which puts further demands on the case to avoid interfering with wireless power transmission to the smartphone from a wireless charging device.

Generally, wireless charging involves a coil of electrically conductive wire within the smartphone itself (typically on a rear surface of the smartphone beneath an outer housing thereof). A corresponding coil of conductive wire is provided on the charging stand. The two coils are brought adjacent to each other and then inductive coupling between the coils causes current in one coil to induce current in the other coil, resulting in power transfer from the charging stand coil to the smartphone coil. This energy can then be transmitted to a battery of the smartphone port for recharging of the smartphone battery (or use of the electric power directly by the smartphone).

To optimize such wireless charging utilizing inductive coupling, it is desirable to precisely align the coils together. To facilitate such alignment, some smartphones have been provided with arrays of magnets adjacent to the coil within the smartphone.

Corresponding magnets of opposite polarity and with a similar configuration and spacing can engage with the magnets within the smartphone to cause the smartphone to be precisely aligned with and attached to the charging device/stand. Such attachment and alignment keep the smartphone optimally placed during wireless charging sessions. One such magnetic alignment/attachment system for wireless charging is provided for the iPhone under the brand MagSafe (both "iPhone" and "MagSafe" being trademarks of Apple Inc. of Cupertino, California).

With the MagSafe system, the magnets are arranged in a circle outboard of and surrounding the coil within the rear surface of the iPhone, beneath its outer housing. In particular, an array of twelve magnets are located around the charging coil in at least one embodiment, with the magnets spaced a regular distance from each other and in a circular pattern surrounding the charging coil (like numbers on a traditional clock face). A similar array of twelve magnets can be provided on a charging stand surrounding a power transmission coil of the charging stand, and with the twelve magnets of the charging stand oriented similar to those within the iPhone, but with a reverse polarity, to provide strong attraction between the twelve magnets of the charging stand and the twelve magnets of the iPhone. Rotational alignment of the magnets can occur in twelve different rotationally distinct positions, provided that the magnets are of similar size and similar spacing.

With the provision of this array of magnets surrounding the charging coil within some smartphones, an opportunity exists to provide smartphone accessories which can attach to the smartphone utilizing the same array of magnets which are provided for wireless charging alignment. For instance, smartphone cases are known to be provided with magnets therein so that the case itself attaches to the smartphone at least partially through magnetic attraction between the case and magnets in the smartphone, rather than necessarily exclusively relying upon the case surrounding and gripping corners of the smartphone. A variety of other accessories are also known to enhance functionality of the smartphone, and which can utilize this array of magnets built into the smartphone, for attachment of such accessories thereto. Still, a need exists for improved holders and stands and multi-purpose implements (bottle openers, etc.) which can attach to the smartphone and provide enhanced utility for the smartphone.

SUMMARY OF THE INVENTION

With this invention an accessory is provided which is attachable to an array of magnets built into a rear surface of a smartphone, which accessory acts as a holder and stand to allow for the smartphone to be more readily held within a hand of a user in a large variety of orientations, and to also act as a stand which can support the smartphone upon various surfaces (or from hooks or other supports), so that the smartphone can be utilized in a hands-free manner. This invention also beneficially includes geometric features thereon which allows the accessory to act as a bottle opener able to assist in removing a bottle cap from a bottle. The benefits of smartphone use can thus be enhanced through simultaneous enjoyment of a beverage of one's choice.

The invention includes an outer base of annular planar form defining a perimeter of the invention. In an example embodiment shown in included drawings, this base has two planar faces which are parallel with each other and which faces extend between an outer edge and an inner edge. The outer edge is shown having a circular form, but could have other forms including square or multi-faceted. The edges are preferably perpendicular to the faces, but could be beveled (especially adjacent the outer face) and preferably are at least provided with somewhat rounded corners.

The base includes at least one magnet attached thereto or embedded therein. This magnet could in one embodiment merely be a ferrous material which can interact with the magnets within the smartphone to provide magnetic attraction and attachment of the base to the smartphone (the term "magnet" thus broadly including true magnets and ferrous materials which function as magnets when located within a magnetic field and which exhibit and facilitate magnetic attraction forces). The magnet within the base could alternatively be an array of magnets (e.g. twelve separate magnets spaced apart) sized and otherwise configured to match closely the array of magnets in the smartphone, but with opposite polarity. For instance, if the smartphone has its magnets oriented with north facing outwardly from the case, the base of this invention would have its magnets oriented with south facing toward the smartphone. In this way, magnetic attraction would be maximized. Furthermore, registry of the magnets between the smartphone and this invention could occur at twelve (for instance) different rotational orientations relative to each other and still provide secure attachment.

The inner edge of the base, in one embodiment, is circular and supports part of a bearing therein. A center ring is located radially inward from the inner edge of the base. This center ring includes an outside edge which is adjacent to the inner edge of the base, with an inside edge opposite the outside edge. The center ring is preferably annular in form with an inner face and an outer face which are preferably parallel to each other and spaced apart by a thickness of the center ring. This thickness of the center ring can in one embodiment be similar to a thickness of the base between the two faces thereof. The surfaces of the center ring can, in one embodiment, be co-planar with opposing faces of the base. Most preferably, the center ring is slightly thinner and the base.

The outside edge of the center ring preferably includes portions of the bearing therein which interact with portions of the bearing in the inner edge of the base to provide a bearing structure between the center ring and the base which facilitates rotation of the center ring relative to the base. Examples of such a bearing could include a series of ball bearings oriented in a train between an inner race in the outside edge of the center ring and an outer race located within the inner edge of the base. As another option, the bearing could include low friction surfaces of complementary form, which merely glide over each other with a minimum of friction to resist rotation. If desired, various different stops could be provided within this bearing so that the center ring would register at different rotationally displaced orientations relative to the base. As another option, no such stops could be provided, so that the center ring could freely rotate. Friction could be minimized or maintained at a design level.

With such a configuration between the center ring and the base, the base is initially attached to the rear surface of the smartphone and the base is held stationary relative to the smartphone. The center ring is then free to rotate relative to the base, while the base itself does not rotate relative to the smartphone.

In one embodiment, the center ring can include electromagnets therein which can be powered on or off. Power for such electromagnets could be provided from the smartphone itself by scavenging electric power from the coil within the smartphone. Electromagnets within the ring could be turned on to provide some limited resistance to rotation of the center ring relative to the base, and then could be turned off to provide free rotation, so that a degree of resistance to rotation could be controlled through such electromagnets. As a similar alternative, the magnets within the base could be electromagnets or separate electromagnets could be included within the base, and the center ring could be provided with permanent magnets therein which could interact with the electromagnets in the base in a similar fashion to either allow free rotation or some resistance to rotation. It is also conceivable that such an electromagnet could be controlled (the electromagnets either being within the center ring, the base, or both), so that a user, such as through an app running on the smartphone, could control a position of the center ring relative to the base.

The center ring includes an open space inboard of the inside edge thereof. This center space could be various different shapes, but in the embodiment disclosed herein is generally circular in form and with the inside edge being perpendicular to the faces of the center ring. In one embodiment, this space and the inside edge are modified from being just a plain circular form at two opposing edges with ears provided thereon which are configured to be able to engage a crimped edge of a bottle cap or an upper surface of a bottle cap. In one embodiment, the ears attach to the base, rather than to the center ring, but extend radially inwardly into the open space inboard of the center ring by passing beneath an inner face of the center ring.

The two ears, in the embodiment disclosed herein, are generally circular in form and with the inside edge being perpendicular to the surfaces of the center ring. Each of these ears preferably is semi-circular in form and has a thickness less than a thickness between the surfaces of the center ring, and with the ears aligned with only a lower surface of the center ring closer to the smartphone, when the base is attached to the smartphone. The ears provide a bottle opener tool as described below.

The inside edge of the center ring also preferably includes a pivot joint aligned with one of the ears and on an outer side of that adjacent ear. A loop is pivotably attached through this pivot joint to the center ring. The loop can thus be pivoted about a pivot axis within the pivot joint, between a collapsed position generally within planes defined by the surfaces of the center ring, and a deployed position rotated out of the plane within which the center ring is oriented. This loop can be gripped, such as with the finger of the user within the loop, and forces can be applied while the ears are engaging a bottle cap (one edge of one ear under a crimped edge of the bottle cap and the outer edge of the other ear on top of the bottle cap), to provide a fulcrum and leverage to easily remove the bottle cap from the bottle, and so that the overall device can function as a bottle opener. First, the entire device would be removed from the smartphone and then the ears would engage the bottle cap and rotational force would be provided, either by utilizing the loop or by utilizing the base, or both, until the bottle cap has been removed. The device can then be replaced upon the rear of the smartphone to continue to function as a stand or holder for the smartphone.

The center ring can be rotated to position the loop at a variety of different orientations relative to the smartphone, with a position for the loop selected so that it is most appropriate for supporting the smartphone in the orientation desired. A portion of the center ring opposite the pivot joint can be provided with a relief notch to facilitate a finger reaching under a portion of the loop opposite the pivot joint, so that the loop can be pivoted away from the plane in which the center ring is oriented, until the loop is oriented where desired relative to the center ring. The center ring can be rotated relative to the base so that the loop is further position where desired. The smartphone can then rest upon a horizontal (or other) surface with the loop acting as a leg of a stand to hold up the smartphone at a desired angle.

In one embodiment, friction within the pivot joint between the loop and the center ring is sufficient so that the loop can be held securely in a variety of different positions relative to the center ring. In another embodiment, various different stops can be provided between the loop and the center ring at the pivot joint. In this way, the loop can be easily pivoted through the pivot joint, but has some resistance to rotation at various different stops at different angular displacements of the loop relative to the center ring, and about a pivot axis passing through the pivot joint and within a plane in which the center ring and base are oriented.

While the device of this invention is shown with a loop pivotably attached to the pivot joint, some other form of leg could be utilized in place of the loop and to act as a stand leg according to an alternative embodiment. In one embodiment it is considered desirable that the loop can pivot 119° away from an initial orientation where the loop is coplanar with the center ring and base. Generally pivoting between 90° and 150° from its collapsed position is desirable. It can be seen that through rotation of the center ring relative to the base that the loop or other stand structure can be oriented either to support the smartphone for viewing in a landscape orientation or in a portrait orientation.

The loop could also conceivably be utilized to hang the smartphone, such as from a hook, or the loop could engage some other structure either with the loop suspended from such a structure or with the loop resting upon such a structure. Multiple ways are thus provided for the device of this invention to effectively function as a stand/holder to properly orient the screen of the smartphone for viewing by a user in a hands-free manner.

OBJECTS OF THE INVENTION

Accordingly, a primary object of the present invention is to provide a holder for a smartphone to facilitate secure holding of the smartphone either in a hand of a user or resting upon an underlying surface in the form of a stand.

Another object of the present invention is to provide a holder stand which facilitates the resting of the smartphone on a flat underlying surface at an angle for viewing, and which holder can also be conveniently held with fingers of a user.

Another object of the present invention is to provide a holder which includes a loop size to receive at least one finger passing therethrough while the holder is attached to a smartphone rear.

Another object of the present invention is to provide a holder with a loop that rotates relative to other portions of a smartphone holder, so that fingers can pass through the loop and the loop can be oriented relative to other portions of the holder in a most convenient manner to assist in holding the smartphone.

Another object of the present invention is to provide a stand with a loop or other strut that can both pivot between a deployed and a stored configuration, and which can also rotate relative to other portions of the stand, so that a smartphone can be supported upon surface in various orientations.

Another object of the present invention is to provide a holder for a smartphone which is removably attachable to the smartphone through magnets adjacent to a rear of the housing of the smartphone.

Another object of the present invention is to provide a holder for a smartphone which can be removed from the smartphone and then used as a bottle opener when desired, and then readily and easily reattached to the smartphone.

Another object of the present invention is to provide a holder for a smartphone which is circular in form and which includes a magnet which attaches to the smartphone through a circular magnet array adjacent to a rear of the housing of the smartphone, which holder includes a loop which connects as either a stand or a finger engaging structure, and which loop can rotate relative to other portions of the holder for most convenient orientation of the loop either for hand engagement or for supporting the smartphone upright resting upon an underlying surface.

Another object of the present invention is to provide a method for holding a smartphone with a hand of the user or resting upon a surface, and which method also includes a method for removing a bottle cap from a neck of a bottle.

Other further objects of the present invention will become apparent from a careful reading of the included drawing figures, the claims and detailed description of the invention.

BRIEF DESCRIPTION OF THE DRAWINGS

FIG. 1 is a perspective view from the rear of a smartphone with a holder according to one embodiment of this invention attached to a rear of the smartphone and with a loop pivoted away from other portions of the holder to allow the loop to either rest upon an underlying surface or be engaged by fingers of a user to assist in holding the smartphone.

FIG. 2 is a perspective view of that which is shown in FIG. 1, but with the holder removed from the smartphone and in position being used to remove a bottle cap from a neck of a bottle.

FIG. 3 is a perspective view of the holder of FIGS. 1 and 2 and with a magnet exploded from a rear thereof, which magnet allows the holder to be attached to a magnet array of a smartphone.

FIG. 4 is a side elevation view of the holder of FIG. 1 and with a loop of the holder pivoted a maximum amount away from a plane in which other portions of the holder are oriented.

DESCRIPTION OF THE PREFERRED EMBODIMENT

Figure 5:
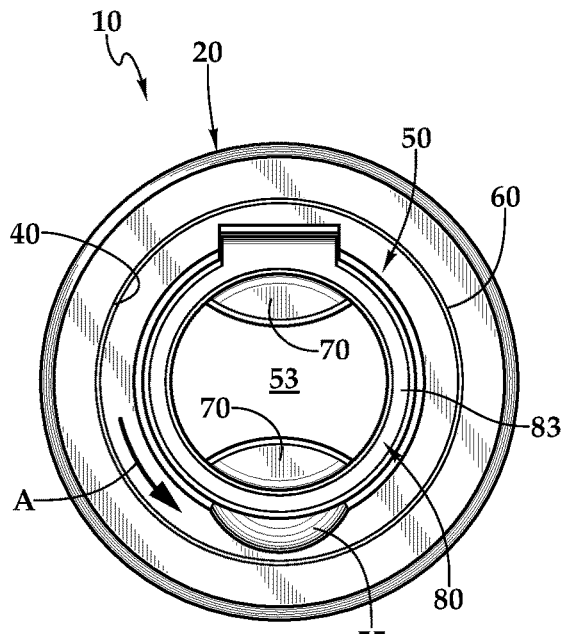
FIG. 5 is a front elevation view of the holder of FIG. 1, and with the loop shown in a stored position.

Referring to the drawings, wherein like reference numerals represent like parts throughout the various drawing figures, reference numeral 10 is directed to a holder for a smartphone S (FIG. 1), which can either act as a stand for supporting the smartphone S on an underlying surface, or the holder can be gripped by fingers and/or a hand of a user, to allow for secure holding of the smartphone S buy a user. The holder 10 has features to help it function optimally as a smartphone S holder 10, and also includes ears 70 within the holder 10 which can function as a bottle opener for a bottle cap BC attached to a neck N of a bottle, when the holder 10 is removed from the smartphone S (FIG. 2).

Figure 6:
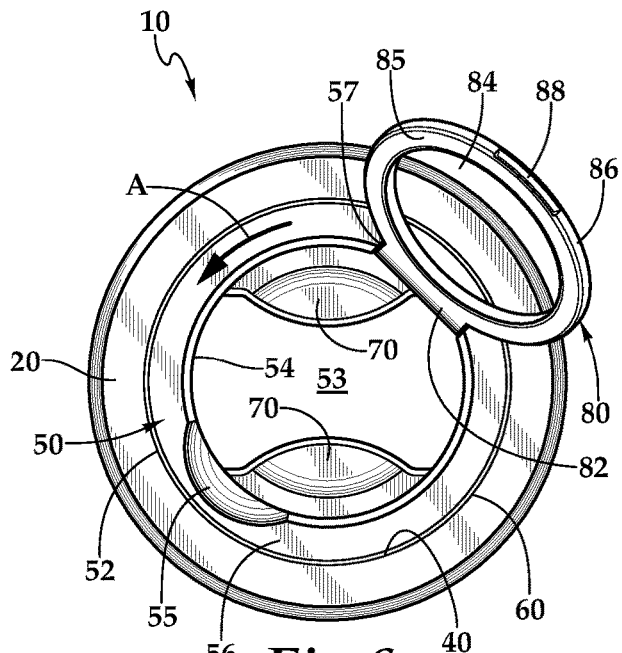
FIG. 6 is a front elevation view of the holder of FIG. 1, and with the loop shown in a deployed position.
Figure 7:
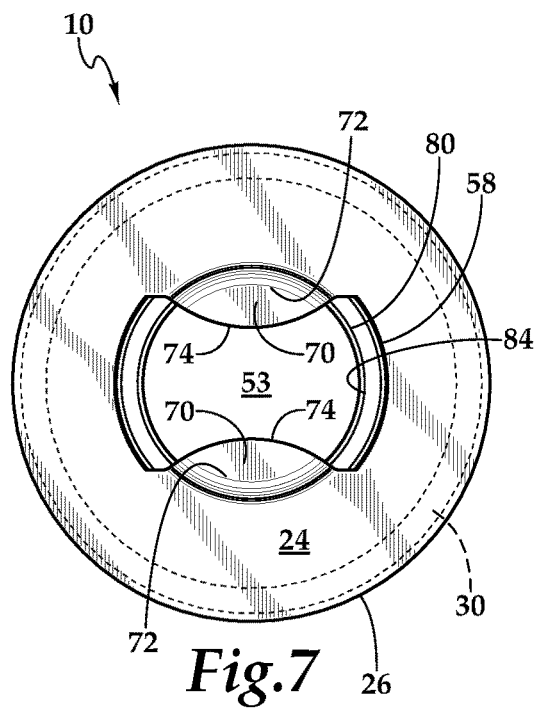
FIG. 7 is a rear elevation view of that which is shown in FIG. 5.
Figure 8:
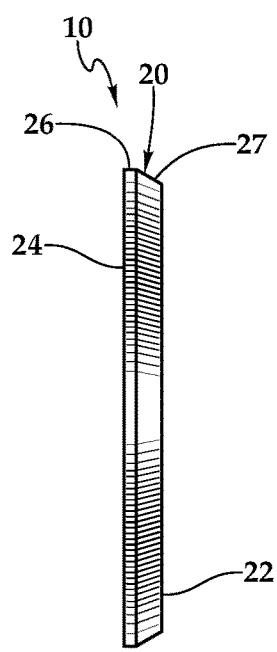
FIG. 8 is a side elevation view of that which is shown in FIG. 5.

In essence, and with particular reference to FIGS. 1 and 2, basic details of the holder 10 are described, according to an example embodiment. The holder 10 includes an outer base 20 which is generally annular in form surrounding an open space 53. A magnet 30 is incorporated into the outer base 20, which magnet 30 attaches to a magnet array M adjacent to a rear R of a housing H of a smartphone S, allowing the outer base 20 of the holder 10 to be removably attached through magnetic forces to the rear R of the smartphone S. A center ring 50 of the holder 10 surrounds the open space 53 on inward portions of the holder 10 inboard of the outer base 20. A race 40 on inwardly facing portions of the outer base 20 interacts with a bearing 60 on outwardly facing portions of the center ring 50, to facilitate rotation of the center ring 50 relative to the outer base 20 (about arrow A of FIGS. 1, 5 and 6).

Ears 70 extend radially inwardly into the open space 53, either from the center ring 50 or from the outer base 20 (and beneath the center ring 50). The ears 70 are configured so that one ear 70 can fit under a crimped edge of a bottle cap BC while the other ear 70 rests upon the top of the bottle cap BC, so that the bottle cap BC can be popped off of a neck end of a bottle (along arrow P of FIG. 2). A loop 80 is pivoted (about arrow B of FIGS. 1 and 4) through a hinge 90 to the center ring 50. This loop 80 includes an opening 84 through which a finger (or thumb) of a user can pass, to allow convenient holding of the smartphone S in the hand of a user in a secure fashion utilizing the holder 10. This loop 80 can also rest upon an underlying surface so that the holder 10 supports the smartphone S at an angle relative to an underlying surface for hands-free viewing of a screen of the smartphone S (FIGS. 1 and 4).

More specifically, and with particular reference to FIGS. 1 and 3-7, particular details of the outer base 20 of the holder 10 are described, according to this one example embodiment. The outer base 20 defines an outer perimeter of the holder 10 and that portion of the holder 10 which is removably attachable to the smartphone S. The outer base 20 could have a variety of different shapes, but is in this embodiment is annular in form. The outer base 20 is bounded between a top face 22 and bottom face 24 (FIG. 7), which are both planar and parallel to each other. The base 20 is also bounded by an outer edge 26 opposite an inner edge 28. The outer edge 26 and inner edge 28 are preferably both cylindrical with the outer edge 26 bounding an outer perimeter of the holder 10. The outer edge 26 in this embodiment has a bevel 27 on portions of the outer edge 26 adjacent to the top face 22, to avoid an abrupt edge.

A magnet 30 is located within the outer base 20 adjacent to the bottom face 24. In one embodiment, this magnet 30 could be flush with the bottom face 24 or embedded somewhat behind the bottom face 24, provided the material forming the bottom face 24 does not interfere with magnetic attraction between the magnet 30 and the magnet array M of the smartphone S. The magnet 30 could be a true magnet or array of magnets, or could merely be a ferrous band or a ring of ferrous elements. Thus, the term magnet should be generally considered to include any substance which exhibits magnetic attraction to the magnet array M within the housing H at the rear R of the smartphone S. In one embodiment, this magnet array M is configured according to the MagSafe product configuration provided by Apple Inc. of Cupertino California. Such a magnet array M is in a circular form having a diameter that is between a diameter of the outer edge 26 and the inner edge 28 of the outer base 20. Preferably the magnet 30 has a similar diameter to that of the magnet array M. In one embodiment, the magnet 30 is a ring of strong neodymium magnets (FIG. 3).

With such a configuration, the outer base 20 can be attached to the rear R of the smartphone S, with the magnet 30 generally aligned with the magnet array M of the smartphone S. Because the outer base 20 is radially symmetrical (in at least one embodiment), and made up of multiple separate magnets (in at least one embodiment), the outer base 20 can be attached to the smartphone S in a variety of distinct orientations which share a common position but a distinct radial offset relative to each other. For instance, if the magnet array M has twelve magnets and the magnet 30 is a ring of 12 separate magnets, at least twelve different radially offset orientations could be provided between the outer base 20 and the magnet array M of the smartphone S and still provide a similar secure attachment.

The inner edge 28 of the outer base 20 defines a race 40 which is one portion of a rotational interface between the outer base 20 and the center ring 50. The race 40 provides a surface upon which the bearing 60 of the center ring 50 can be supported. The race 40 could be configured as a track for roller bearings or other rotating bearing elements, or could be a smooth surface, optionally with a low surface coating, which merely allows the bearing 60 to rest and slide thereon. The race 40 also preferably has an interlocking structure with the bearing 60 of the center ring 50 so that the race 40 and bearing 60 act together to keep the center ring 50 from any motion relative to the outer base 20 other than rotational motion of the center ring 50 about a central rotational axis aligned with a center of the outer base 20.

In one embodiment, the center ring 50 can rotate freely relative to the outer base 20, with the bearing 60 moving in a low friction manner relative to the race 40. In other embodiments, a series of stops can be provided or detents, or other impediments, so that the center ring 50 does not freely rotate (along arrow A of FIGS. 1, 5 and 6), but rather encounters impediments so that the center ring 50 tends to register at distinct positions rotationally offset relative the outer base 20. A variety of different numbers of such stops or detents could be provided so that areas of greater friction are encountered periodically and the center ring 50 would tend to hold a variety of discrete positions relative to the outer base 20, rather than an infinite number of rotationally offset orientations.

In one embodiment, such a configuration of the race 40 and bearing 60 to prefer various different distinct or rotational orientations could be provided by magnets within the race 40 and/or the bearing 60. When magnets are aligned (with each other and/or with magnet elements within the magnet 30 of the base 20 and/or the magnet array M of the smartphone S), preferred positions will be identified. When magnets are out of alignment, some degree of repulsion and biasing towards other positions would be encouraged. For instance, if eight different magnets were provided at regular intervals along the race 40 and the bearing 60, and if the magnets are button magnets with the magnets on the race 40 having a north end facing the bearing 60 and with the bearing 60 having a similar number of similarly spaced button magnets with south facing toward the race 40, when these magnets on the bearing 60 are aligned with magnets on the race 40, preferred orientations would be defined. When rotated away from these preferred orientations, resistance would be provided and forces would be encountered tending to cause alignment of the center ring 50 through interaction of magnets in the bearing 60 and race 40, to a nearby clockwise or counter-clockwise displaced preferred orientational alignment.

The strength of these magnets could be low if only a small amount of biasing toward particular orientations are desired, but the magnets could be stronger if a greater amount of such biasing is desired. As a further option, at least one of the magnets associated with the race 40 or bearing 60 could be electromagnets, controllable in their strength. As one option, such electromagnets could be located within the race 40 and the outer base 20 could include a coil for inductive coupling with the coil C (Figure one) located within the housing H of the smartphone S. In this way, an electromagnet associated with the race 40 could scavenge power from the smartphone S and use that electromagnet to bias an orientation of the center ring 50 relative to the outer base 20. Furthermore, such an electromagnet could be controlled to cause the center ring 50 to rotate relative to the outer base 20. The base 20 could include a Bluetooth or other wireless communication protocol and a processor, memory, power supply, etc. to allow for active control and positioning, such as through an app running on the smartphone S.

With continuing reference to FIGS. 1, 3 and 5-7, specific details of the center ring are described, according to this example embodiment. The center ring 50 could be eliminated in some embodiments and the loop 80 could radially pivot relative to the outer base 20. However, the center ring 50 is preferably provided so that an orientation of the loop 80 relative to the outer base 20 can be adjusted by rotation of the center ring 50 relative to the outer base 20, as described in detail above. The center ring 50 is an annular structure which resides inboard of the inner edge 28 of the outer base 20. In one embodiment, the center ring 50 has a thickness between an outer face 56 and inner face 58 which is similar to a thickness of the outer base 20. However, most preferably a thickness of the center ring 50 is somewhat less than a thickness of the outer base 20, and with the outer face 56 coplanar with the top face 22 of the outer base 20. This allows for the ears 70 to attach to the outer base 20 and reside beneath the inner face 58 of the center ring 50. As an alternative, the ears 70 could be attached to the center ring 50 rather than to the outer base 20 directly.

The center ring 50 includes and outside edge 52 which supports the bearing 60 thereon (describe in detail above). An inside edge 54 is provided which is spaced from the outside edge 52. Preferably this inside edge 54 surrounds an open space 53 which is circular in form. Other shapes rather than circular could be provided as an alternative for this open space 53. This inside edge 54 also includes a relief notch 55 therein which allows for the loop 80 to be more conveniently gripped by a finger of a user for pivoting of the loop of the center ring 50 (about arrow B of FIGS. 1 and 4). A pivot notch 57 is also preferably provided within the inside edge 54. This pivot notch 57 is opposite the relief notch 55 and defines a location where the neck 82 of the loop 80 attaches through a hinge 90 to the center ring 50.

The center ring 50 is preferably a rigid monolithic structure formed of a material similar to that which forms the outer base 20. With such a rigid form, the center ring 50 can maintain tight tolerances relative to the outer base 20 to facilitate rotation of the center ring 50 relative to the outer base 20. One suitable material for the center ring 50 and outer base 20 would be stainless steel. Other metals or rigid non-metals could alternatively be utilized.

Ears 70 define a bottle opener feature for the holder 10. The ears 70 preferably extend from the inner edge 28 of the outer base 20, but could alternatively extend from the inside edge 54 of the center ring 50. While as few as just one ear 70 could be utilized, most preferably two ears 70 are provided, at opposing positions extending radially inwardly from the inner edge 28 of the outer base 20. Each ear 70 is preferably semi-circular in form and extends from a root 72 adjacent to the inner edge 28 to an edge 74 opposite the root 72.

Spacing between the edges 74 of the two ears 70 are preferably less than a diameter of a bottle cap BC, such as that closing an opening upon a neck N of a bottle. In this way, one ear 70 can be placed under a crimped edge of the bottle cap BC while the other ear can rest upon an upper surface of the bottle cap BC of a fulcrum point to provide leverage. The outer base 20 can then be pivoted (along arrow P of FIG. 2) to release the crimped edge of the bottle cap BC from the neck N of the bottle and to have the bottle cap BC removed from the bottle.

As an option, the loop 80 can be aligned with one of the ears 70 (or positioned so that it is always adjacent to one of the ears 70 if the ears 70 are attached to the center ring and then the ear 70 adjacent to the loop 80 is placed under the crimped edge of the bottle cap BC and lifted upward while the opposite ear 70 provides the leverage pivot point (along arrow P' of FIG. 2). In such a configuration, a finger within a loop 80 can provide the lifting force while the ear 70 adjacent to the loop 80 is located under the crimped edge of the bottle cap BC (in an orientation opposite that which is shown in FIG. 2).

The holder 10 can be conveniently removed from the smartphone S and then used as a bottle cap BC opener. The holder can then be returned to the rear R of the smartphone S when such bottle cap BC removal process has been completed. In this way, a user always has a bottle cap BC opener handy when the holder 10 is present on the user's smartphone S.

With particular reference to FIGS. 1-6, details of the loop 80 are described, according to this example embodiment. The loop 80 is a rigid monolithic structure which is pivotably attached through the hinge 90 to the center ring 50 at the pivot notch 57. The loop 80 includes a neck 82 which is configured complementary with the pivot notch 57 to construct the hinge 90. As one option, pintle tabs extend laterally along a centerline from ends of the neck 82 on a pivot access of the hinge 90 and reside within holes adjacent to the pivot notch 57, so that these holes act as supports for the pins extending from the neck 82, and the hinge 90 is provided. Reverse structure could be involved with a neck 82 which includes holes therein and small pins extend from opposing surfaces of the pivot notch 57, and fit together to construct the hinge 90. As a further alternative, a through bore could pass through the neck 82 and a separate pintle could extend through this hole in the neck 82 and into bores on opposing sides of the pivot notch 57 to receive ends of the pintle and allow the loop 80 to pivotally attached to the center ring 50 through the hinge 90. This pintle could be removable or captured. As one option, the pintle could be adjustable in length by having a telescoping form and with a spring biasing a pintle towards a longer form, but compressible to a lesser form to allow for installation.

While the loop 80 could be replaced with a plain strut pivoting with the neck 82, the loop 80 preferably is provided and preferably has a circular form surrounding an opening 84 with the entire loop 80 pivotable about the neck 82 and hinge 90. The opening 84 receives at least one finger (e.g. an index finger or thumb) of a user therethrough. A user can thus engage the loop 80 and hold the smartphone S at the same time in different orientations without requiring removal and replacement of fingers (or thumb) of the user relative to the loop 80. Furthermore, the loop 80 can be pivoted fully (along arrow B of FIGS. 1 and 4) and then act as a stand where a foot 87 opposite the neck 82 rests upon an underlying surface and allows the smartphone S to be supported in an angled manner for viewing while resting upon such a horizontal surface. By rotation of the center ring and loop 80 relative to the outer base 20, such support, through the holder 10 configured in the form of a stand resting upon the foot 87 of the loop 80, can allow for viewing of the smartphone S either in a landscape or in a portrait orientation relative to the underlying surface and a viewer.

A small slot 88 is preferably provided in an outer perimeter 86 of the loop 80 adjacent to the foot 87. This slot helps to facilitate initial gripping and pivoting of the loop 80 (about arrow B of FIGS. 1 and 4) when the loop is initially fully collapsed into the center ring 50 and would otherwise be difficult to grasp. Relief notch 55 allows for a fingernail of a user or other structure to pass in and into the slot 88 to then pivot the loop (along arrow B) to a desired position.

In one embodiment, the loop 80 is prevented from rotating beyond 119°, which has been found to be a convenient angle for utilizing the loop 80 as a form of stand when the holder 10 is so configured and placed upon an underlying surface. Any angle from 90° to 150° could be provided as alternatives. As an alternative to the loop 80, a leg or other structure without an opening therein could alternatively be utilized. The loop 80 generally includes the perimeter 86 opposite the opening 84 and with a first side 83 parallel with and spaced from a second side 85. The first side 83 is preferably coplanar with the outer face 56 of the center ring 50 and the top face 22 of the outer base 20. The second side 85 resides adjacent to and above the ears 70 whether the ears 70 are attached to the center ring 50 or to the outer base 20. In a third use of the loop (other than as a stand or finger engagement), the loop 80 can fit over a hook or other similar structure. The whole smartphone S and holder 10 can thus be suspended through the loop, such as to allow the smartphone to hang on a cubicle wall facing a user in the cubicle or other work space.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When embodiments are referred to as "exemplary" or "preferred" this term is meant to indicate one example of the invention, and does not exclude other possible embodiments. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A stand for a smartphone, the stand comprising in combination:
    a base including at least one magnet therein and a planar face oriented relative to the at least one magnet to facilitate attachment of the base to a portion of a smartphone with the magnet engaging a magnet within the smartphone and with the face of the base engaging a surface of the smartphone;
    said base including a circular inner edge;
    a center ring located adjacent to said inner edge of said base, said center ring including an outside edge rotatably supported by said inner edge of said base to allow said center ring to be attached to said base and rotate relative to said base;
    said center ring including a space inboard of said outside edge of said center ring;
    a stand structure located within said space and pivotably attached to said center ring through a pivot joint, said pivot joint facilitating pivoting of said stand structure about
    said pivot joint and relative to said center ring; and wherein said stand structure is in the form of a loop having a center opening therein sized at least as large as an adult human index finger; and wherein said loop can pivot about said pivot joint greater than 90°.

2. The stand of claim 1 wherein said base includes an outer edge which is circular in form.

3. The stand of claim 1 wherein said at least one magnet within said base includes a ring of ferrous material.

4. The stand of claim 1 wherein said at least one magnet includes an array of separate magnets oriented in a circle.

5. The stand of claim 1 wherein said center ring has a thickness between opposing faces which is less than a thickness of said base between opposing parallel faces.

6. A stand for a smartphone, the stand comprising in combination:
    a base including at least one magnet therein and a planar face oriented relative to the at least one magnet to facilitate attachment of the base to a portion of a smartphone with the magnet engaging a magnet within the smartphone and with the face of the base engaging a surface of the smartphone;
    said base including a circular inner edge;
    a center ring located adjacent to said inner edge of said base, said center ring including an outside edge rotatably supported by said inner edge of said base to allow said center ring to be attached to said base and rotate relative to said base;
    said center ring including a space inboard of said outside edge of said center ring;
    a stand structure located within said space and pivotably attached to said center ring through a pivot joint, said pivot joint facilitating pivoting of said stand structure about said pivot joint and relative to said center ring; and
    wherein at least one ear extends radially inwardly partially into said space, said ear shaped to engage beneath a crimped edge of a bottle cap to facilitate bottle cap removal from a bottle.

7. The stand of claim 6 wherein a pair of ears of similar form are spaced radially 180° away from each other within said space of said center ring.

8. A stand for a smartphone, the stand comprising in combination:
    a base including at least one magnet therein and a planar face oriented relative to the at least one magnet to facilitate attachment of the base to a portion of a smartphone with the magnet engaging a magnet within the smartphone and with the face of the base engaging a surface of the smartphone;
    said base including a circular inner edge;
    a center ring located adjacent to said inner edge of said base, said center ring including an outside edge rotatably supported by said inner edge of said base to allow said center ring to be attached to said base and rotate relative to said base;
    said center ring including a space inboard of said outside edge of said center ring;

a stand structure located within said space and pivotably attached to said center ring through a pivot joint, said pivot joint facilitating pivoting of said stand structure about said pivot joint and relative to said center ring; and wherein said magnets are oriented to be compatible with MagSafe magnets of an iPhone smartphone to facilitate attachment of said base to the smartphone.

9. A holder for a smartphone, the holder comprising in combination:

a base including at least one magnetically attracted structure therein, said magnetically attracted structure configured to attach to a rear of a smartphone having a magnet array adjacent to the rear of the smartphone;

a loop pivotably attached at least indirectly through a hinge to said base, said loop having a central opening size large enough to receive at least one finger of a user therethrough;

wherein said loop is pivotably attached to said base through a ring between said loop and said base, said ring rotatable relative to said base;

wherein said ring has a bearing on an outside edge thereof and wherein said base has a race on an inner edge thereof, and with said base having an annular form surrounding said inner edge, said bearing and said race having a complementary form to facilitate rotation of said ring relative to said base; and wherein at least one ear extends radially inwardly from a root to an edge, and with an open space within said ring and inboard of said bearing, which open space is large enough to receive a typical bottle cap, such that said ear can engage a crimped edge of the bottle cap for removal of the bottle cap.

10. The holder of claim 9 wherein said loop has a maximum pivot range away from said base of between about 90° and 150°.

11. The holder of claim 10 wherein said loop has a maximum pivot range of about 119°.

12. The holder of claim 9 wherein at least two ears extend radially inwardly and toward each other from opposite sides of said open space, said ears close enough together to keep the bottle cap and a neck of a bottle to which the bottle cap is attached, from passing entirely through said open space.

13. A method for opening a bottle by removing a bottle cap from a neck of the bottle, the method including the steps of:

removing a holder from a rear of a smartphone housing, the holder having a base including at least one magnetically attracted structure therein, said magnetically attracted structure configured to attach to a rear of a smartphone having a magnet array adjacent to the rear of the smartphone, and a loop pivotably attached at least indirectly through a hinge to said base, said loop having a central opening size large enough to receive at least one finger of a user there through, the holder having at least one ear extending radially inwardly within an open space surrounded by the base, the ear sized relative to the opening so that the ear can fit under a crimped edge of the bottle cap while other portions of a boundary of the open space engage an upper surface of the bottle cap; and popping the bottle cap off of the neck of the bottle by lifting the ear beneath the crimped edge while other portions of the holder engage an upper surface of the bottle cap for leverage.

14. The method of claim 13 wherein said removing step includes the open space being bounded by a pair of ears extending radially toward each other from opposite sides of the open space, and with the ears spaced apart so that a standard bottle cap can have one ear under a crimped edge while the other ear rests on an upper surface of the bottle cap.

15. The method of claim 14 including the further step of replacing the holder back on the rear of the housing of the smartphone by engaging the magnetically attracted structure within the holder to a magnet array within the smartphone and adjacent to the rear, for reattachment of the holder to the smartphone.

\* \* \* \* \*